(12) United States Patent
Fraser et al.

(10) Patent No.: US 6,962,523 B2
(45) Date of Patent: Nov. 8, 2005

(54) POWER TOOL

(75) Inventors: Marc Anthony Fraser, Blackburn (AU); Peter Kingsley Bayly, Euroa (AU)

(73) Assignee: Demain Technology PTY LTD, Braeside (AU)

(*) Notice: Subject to any disclaimer, the term of this patent is extended or adjusted under 35 U.S.C. 154(b) by 0 days.

(21) Appl. No.: 10/234,102

(22) Filed: Sep. 5, 2002

(65) Prior Publication Data

US 2004/0224621 A1    Nov. 11, 2004

Related U.S. Application Data

(63) Continuation of application No. PCT/AU01/00254, filed on Mar. 9, 2001.

(30) Foreign Application Priority Data

Mar. 10, 2000    (AU) .................................. PQ6188

(51) Int. Cl.⁷ ............................................ B24B 23/02
(52) U.S. Cl. .................................. 451/259; 451/359
(58) Field of Search .............................. 451/259, 359, 451/353, 344, 488, 449, 454

(56) References Cited

U.S. PATENT DOCUMENTS

| | | | | |
|---|---|---|---|---|
| 2,079,143 A | * | 5/1937 | Albertson | .................... 310/62 |
| 3,775,911 A | * | 12/1973 | Flagge | ........................ 451/359 |
| 4,870,755 A | | 10/1989 | Schnizler | .................. 30/123.3 |
| 5,020,281 A | | 6/1991 | Neff | ............................ 51/170 |
| 5,099,160 A | | 3/1992 | Strözel et al. | ................ 310/56 |
| 5,172,522 A | * | 12/1992 | Jares | .......................... 451/259 |
| 5,407,381 A | * | 4/1995 | Schaefer et al. | ............ 451/358 |
| 6,241,594 B1 | * | 6/2001 | Lepold | ........................ 451/359 |

FOREIGN PATENT DOCUMENTS

| | | | | |
|---|---|---|---|---|
| DE | 1016153 | * | 9/1957 | ................. 451/359 |
| DE | 3726143 | | 2/1989 | |
| DE | 19707215 A1 | | 9/1997 | |
| EP | 691181 | | 1/1996 | |
| GB | 789189 | | 1/1958 | |
| GB | 898017 | | 6/1962 | |
| GB | 2331268 | | 5/1999 | |
| JP | 11198038 | | 7/1999 | |
| JP | 11333761 | | 12/1999 | |

OTHER PUBLICATIONS

Search Report for EP 01 91 1253.

* cited by examiner

*Primary Examiner*—Robert A. Rose
(74) *Attorney, Agent, or Firm*—Finnegan, Henderson, Farabow, Garrett & Dunner LLP

(57) ABSTRACT

This invention relates to a power tool (1) including an operative element (4) for treating a work piece. The power tool (1) defines an air passageway and includes propelling means (20) operative to induce air to flow through the passageway. The passageway direct the induced air over the power tool's motor (14) to cool the motor (14). The air is exhausted from the tool (1) by exhaust means onto the operative element (4) and a worked face of the work piece. This cools the operative clement (4) which prolongs its working life. Furthermore, the exhausted air facilitates removal of swarf from the worked face.

22 Claims, 8 Drawing Sheets

POWER TOOL

This application is a continuation of PCT International Application No. PCT/AU01/00254 filed 9 Mar. 2001, which claims priority of Australian Patent Application No. PQ 6188 filed 10 Mar. 2000.

FIELD OF THE INVENTION

The present invention relates to power tools, and is applicable to such tools that are hand-held, bench mounted, or free standing. The invention is particularly, but not exclusively, concerned with such tools that treat a work piece by, a cutting, grinding, or other material removal, process.

RELATED APPLICATIONS

The present application is related to the subject matter of provisional patent application entitled "Power Tool Controller" filed on 10, Mar. 2000 by the present applicant, the subject matter of which is incorporated herein by cross-reference.

BACKGROUND OF THE INVENTION

It will be convenient to hereinafter describe the invention with particular reference to an example power tool of the electrically operated hand-held type, but it needs to be understood that the invention has wider application. An example tool of the foregoing type is an angle grinder. Again, as a matter of convenience, the invention will be hereinafter described with particular reference to such a grinder.

Power tools of the foregoing kind tend to develop high temperatures at the work face, and that has the disadvantage of reducing the useful working life of the operative element (e.g., cutting tool, grinding wheel, etc.). In some cases, and particularly relatively large machine tools such as lathes, the temperature problem is attended to by means of a stream of a liquid coolant directed at the work face. That method of cooling is not suited for all types of power tools, and is particularly not suited for use with portable hand-held power tools.

SUMMARY OF THE INVENTION

It is an object of the present invention to provide a power tool having an improved working zone cooling system. In that regard, the working zone is to be understood as including the face of the work piece being treated, and the operative element of the tool being used to treat the work face.

It is a further object of the invention to provide an electrically powered tool having a cooling system of the foregoing kind, and in which the cooling system also cools the electrical motor of the tool. It is a still further object of the invention to provide a power tool that is convenient and relatively safe to operate. Other objects and advantages of the invention will be apparent from the following description of an example embodiment of the invention.

According to one aspect of this invention there is provided a power tool including:
an operative element for treating a face of a work piece,
an electric motor for driving said operative element,
a chamber,
propelling means operative to induce air to flow into said chamber and to move the inducted air through said chamber,
at least one induction passage arranged to allow the inducted air to flow across and cool said motor and flow into said chamber,
exhaust means arranged to receive air flowing from said chamber and to direct that air into a working zone,
said working zone including said operative element and said face of the work piece.

It is preferred that said propelling means operates to pressurize air inducted into said chamber.

It is preferred that the power tool include a hollow housing having an air inlet and an air outlet, said propelling means includes a blower device having a rotary impeller mounted within said housing, and said chamber is formed at least in part between said impeller and an internal surface or surfaces of said housing. It is further preferred that said air inlet and said impeller are arranged substantially coaxial and relatively positioned so that inducted air is drawn over said motor before entering said air inlet.

It is preferred that the power tool include an automatic shut-down facility that is operative to terminate operation of said operative element in predetermined circumstances, including a circumstance in which said tool is not held properly, or a circumstance in which said tool is dropped. It is further preferred that said shut-down facility includes a member that is movable between a position at which said facility is activated, and a position at which said facility is deactivated, and said tool cannot be operated while said member is in said facility activated position.

It is preferred that the shut down facility includes a switch selectively movable between a normal position and a lock position, wherein when the member is in position to deactivate the shut down facility the switch can be moved to the lock position to lock the member in the deactivated position. It is further preferred that the switch is biased towards the normal position such that the switch is moved from the locked position to the normal position automatically after depressing the member. It is further preferred that the switch when in the lock position is manually movable to the normal position.

It is preferred that the power tool include a start button that is manually operable to cause operation of said tool, provided said shut-down facility is deactivated.

It is preferred that the power tool include a body portion containing said chamber and said propelling means, and a head portion carrying said operative element and being connected to said body portion. It is further preferred that said connection enables the position of said head portion to be adjusted relative to said body portion. It is further preferred that said adjustment involves rotational movement of the head portion relative to the body portion, and head locking means is operable to releasably hold said head portion in any one of two or more positions or rotation relative to said body portion. It is further preferred that the power tool include head locking means including at least one detent mounted on the head portion, and two or more cooperative recesses provided in said body potion, said detent being engagable within a selected one of said recesses so as to thereby releasably hold said head portion in a selected one of said positions of rotation. It is further preferred that said head locking means includes two said detents, each detent being located on a respective one of two opposite sides of the head portion, and means biasing each said detent biased towards an engaging position at which it engages a selected said recess.

It is preferred that the power tool includes a handle attached to the head portion, the handle being movable relative to the head portion so as to adopt any one of two or more positions, relative to the head portion. It is further preferred that the power tool includes handle locking means operable to releasably lock said handle in a selected said position. It is preferred that the handle locking means includes a lever associated with the handle, the lever having a lug which is locatable in a hole in the head portion, the lever being movable between a locked position wherein the lug is located in the hole in the head portion, and an unlocked position wherein the lug is separated from the hole in the head portion. It is preferred that the tool includes lever biasing means for biasing the lever towards the locked position. It is further preferred that the head portion includes two or more holes to provide the two or more positions of adjustability for the handle relative to the head portion.

It is preferred that the tool be in the form of a grinder and the operative element be in the form of a grinding or cutting disc.

It will be convenient to hereinafter describe the invention in greater detail by reference to the accompanying drawings showing one form of hand-held power tool incorporating an embodiment of the invention. The particularity of those drawings and the related detailed description is not to be understood as superseding the generality of the definition of the invention as given by the claims.

DETAILED DESCRIPTION

Figure 1:
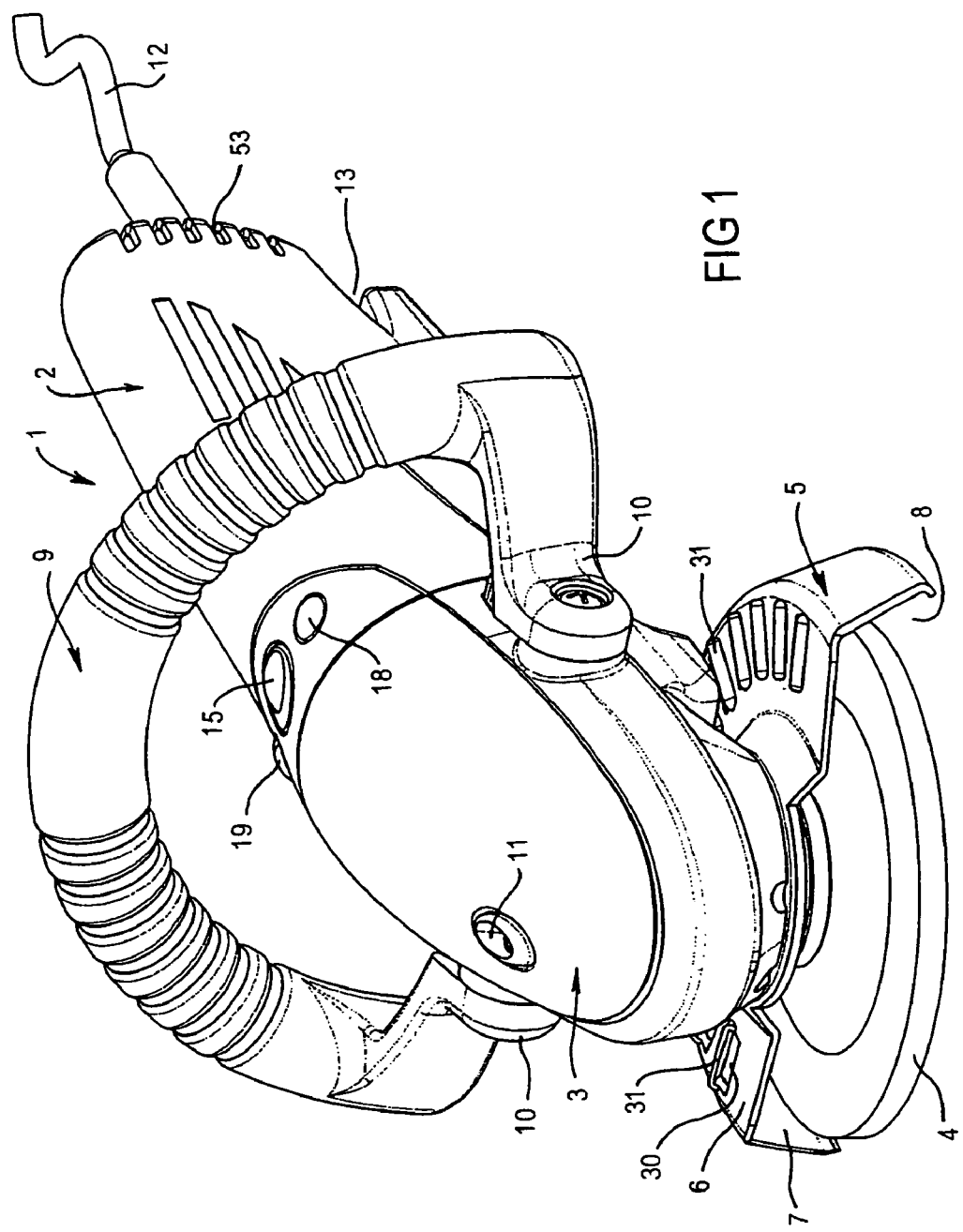
FIG. 1 is a front schematic view of a hand-held tool according to one embodiment of the invention.

FIGS. 1 to 4 show an example hand-held tool incorporating one embodiment of the invention. That example tool is an angle-grinder, and it is to be understood that the invention can be applied to other types of tools, whether they be hand-held, bench mounted, or free standing.

The tool 1 shown by FIGS. 1 to 4 includes a body portion 2 and a head portion 3. An operative element in the form of a rotatable grinding disc 4 is carried by the head portion 3, and a protective guard or shroud 5 overlies and surrounds a substantial part of the disc 4. In that regard, a plate section 6 of the shroud 5 overlies the upper surface of the disc 4, and a skirt 7 of the shroud 5 extends around the periphery of the disc 4. An opening 8 is provided at the front of the shroud 5 to enable engagement between the disc 4 and a work piece (not shown). The disc 4 is arranged for rotation about an axis extending transverse to the longitudinal axis of the tool 1.

It is preferred that the shroud 5 is adjustable so as to enable the opening 8 to be placed at a convenient position relative to the longitudinal axis of the tool 1. By way of example, it may be convenient to place the opening 8 at one side of the tool 1 rather than at the front as shown by FIG. 1. For that purpose, the shroud 5 is capable of rotation about an axis substantially coincident with the rotational axis of the disc 4. In accordance with conventional practice, the shroud 5 may be releasably secured in a selected rotational position by means of a clamping plate (not shown) engaging against the under surface of the plate section 6. Fastening screws may be used to press the clamping plate against the plate section 6 and thereby hold the shroud 5 against rotation.

In the arrangement shown, a loop-type handle 9 extends transversely across the top of the head portion 3 and has each of its ends 10 attached to respective opposite sides of the head portion 3 as hereinafter described. Other types of handles could be used. By way of example, one or more laterally projecting stub handles of a conventional kind could be attached to the head portion 3. Selection of a particular type of handle may be influenced by the nature of the tool being used.

In the example tool shown, a press-button 11 is accessible at the top of the head portion 3. The button 11 is manually depressed to lock the disc 4 against rotation when the disc is being removed from or attached to the head portion 3. In accordance with standard practice, the button 11 is spring influenced to return to an inactive position when pressure is removed.

The example tool shown is electrically powered, and is connectable to a source of AC power through a flexible cord 12 extending from the rear of the body portion 2. A cord storage groove 13 may be provided at the rear underside of the body portion 2 so as to enable convenient wrapping of the cord 12 when the tool is not in use. That is, the cord 12 may be wound about the tool 1 by being looped over the shroud 5 and through the groove 13, and is thereby retained in a stored condition.

Power is connected to the drive motor 14 (FIG. 5) of the tool 1 by depressing a start button 15, which in the example shown is located at the top-front of the body portion 2. Other locations could be adopted. It is preferred however, that simple depression of the button 15 is not sufficient to operate the tool 1. In the arrangement shown, an automatic shut-down facility needs to be deactivated prior to depressing the start button 15. Such deactivation may be achieved by depressing a lever 16 (FIGS. 3 and 4) positioned at the underside of the body portion 2.

The lever 16 is arranged to automatically return to a non-depressed condition if the user of the tool releases grip on the body portion 2, or does not grip that body portion correctly. Under those circumstances, the shut-down facility is activated and power is disconnected from the drive motor 14.

If desired, an interlock switch 17 (FIG. 4) may be provided at the underside of the body portion 2 adjacent the lever 16. The switch 17 is selectively movable between a normal position and a lever lock position. When the switch 17 is in the normal position, the shut-down facility functions as described above. When the switch 17 is in the lever lock position, it locks-the lever 16 in a depressed condition and thereby retains the shut-down facility in a deactivated condition. It is preferred that the switch 17 automatically returns to the normal position if the lever 16 is depressed while the switch 17 is in the lever lock position.

Figure 2:
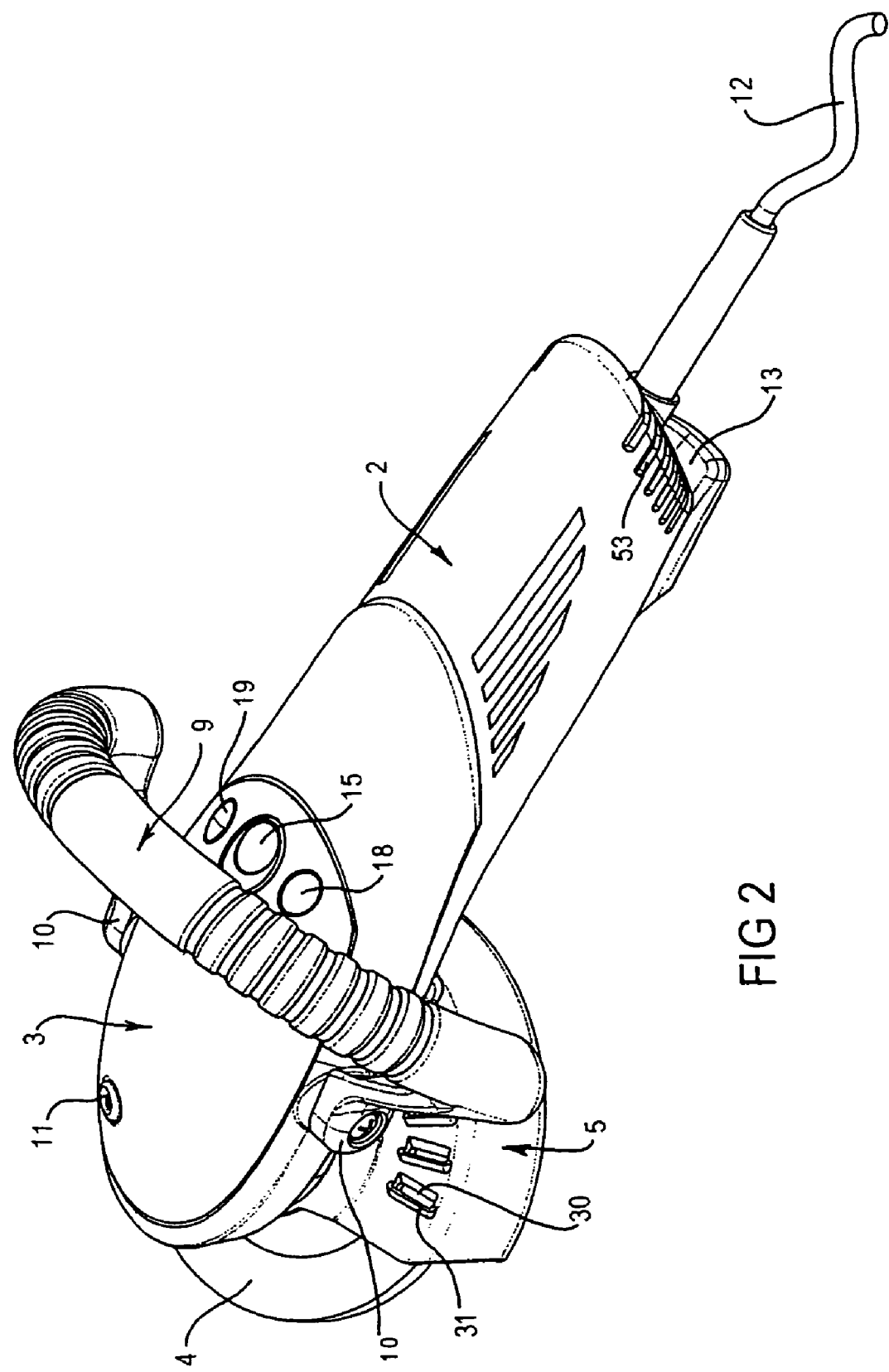
FIG. 2 is a side schematic view of the tool of FIG. 1.
Figure 3:
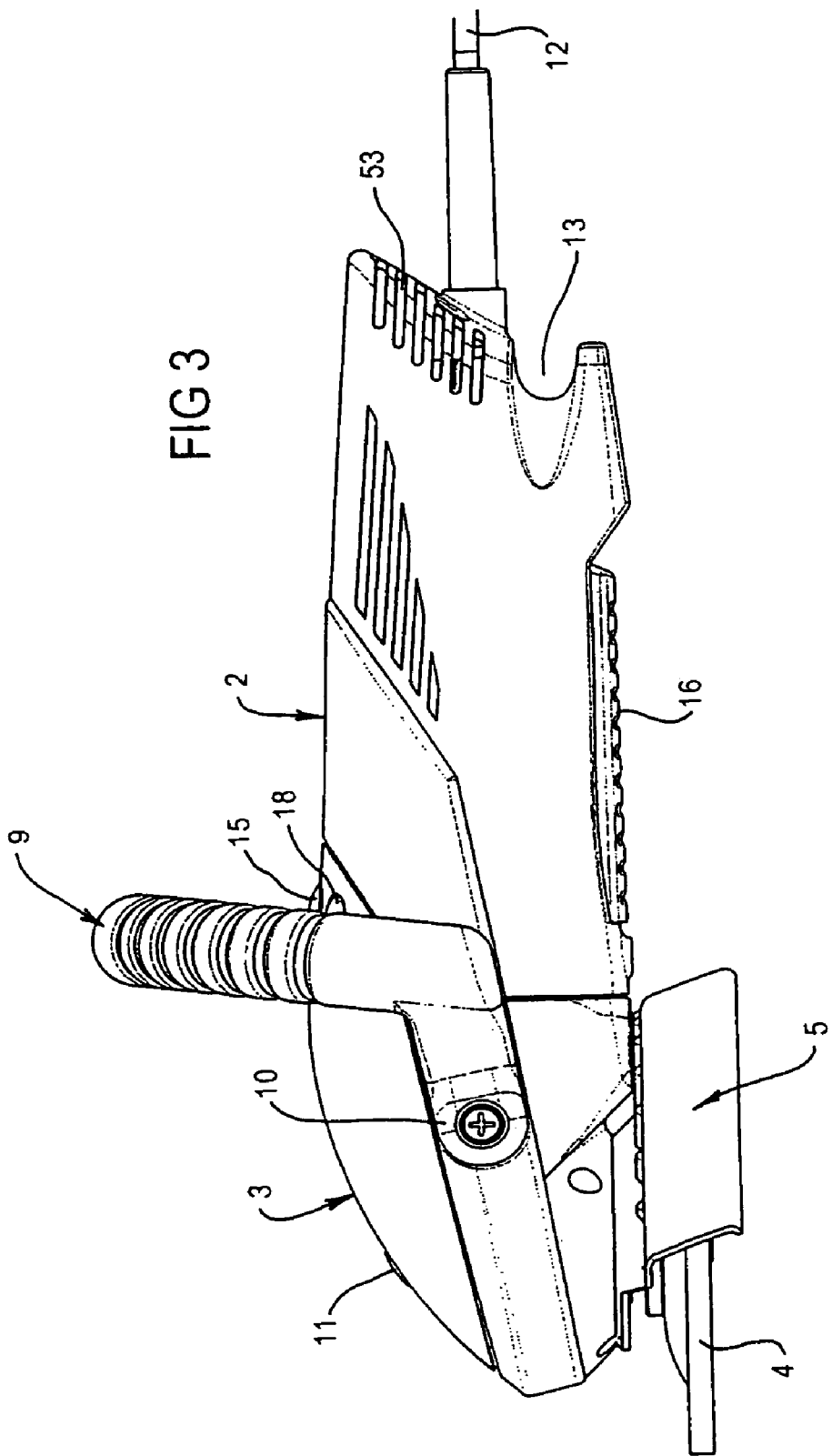
FIG. 3 is a side plan view of the tool of FIG. 1.
Figure 4:
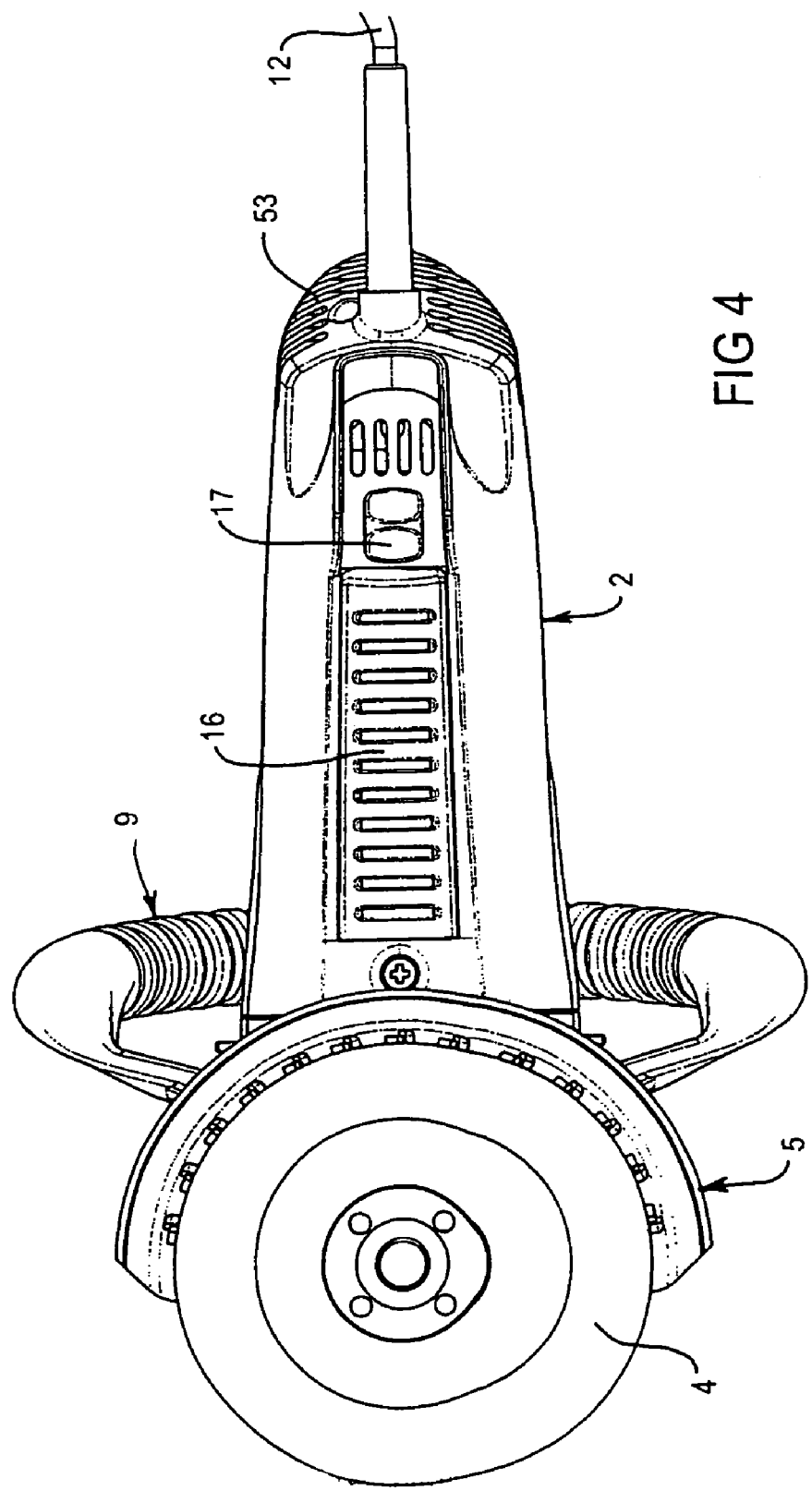
FIG. 4 is a bottom plan view of the tool of FIG. 1.

Tool function indicators 18 and 19 may be located adjacent the start button 15 as best seen in FIGS. 1 and 2. The indicator 18 may provide a visible signal when the tool 1 is subjected to maximum load during operation. The indicator 19 may provide a visible and/or audible signal when the tool reaches an overload condition. Maximum and overload conditions may be determined by monitoring the current being drawn by the tool.

It is a feature of the tool 1 that it includes propelling means operative to direct a flow of air over the working zone of the tool. In that regard, the working zone includes the face of the work piece being treated, and also includes the operative element of the tool 1, which is the disc 4 in the example tool shown.

Figure 5:
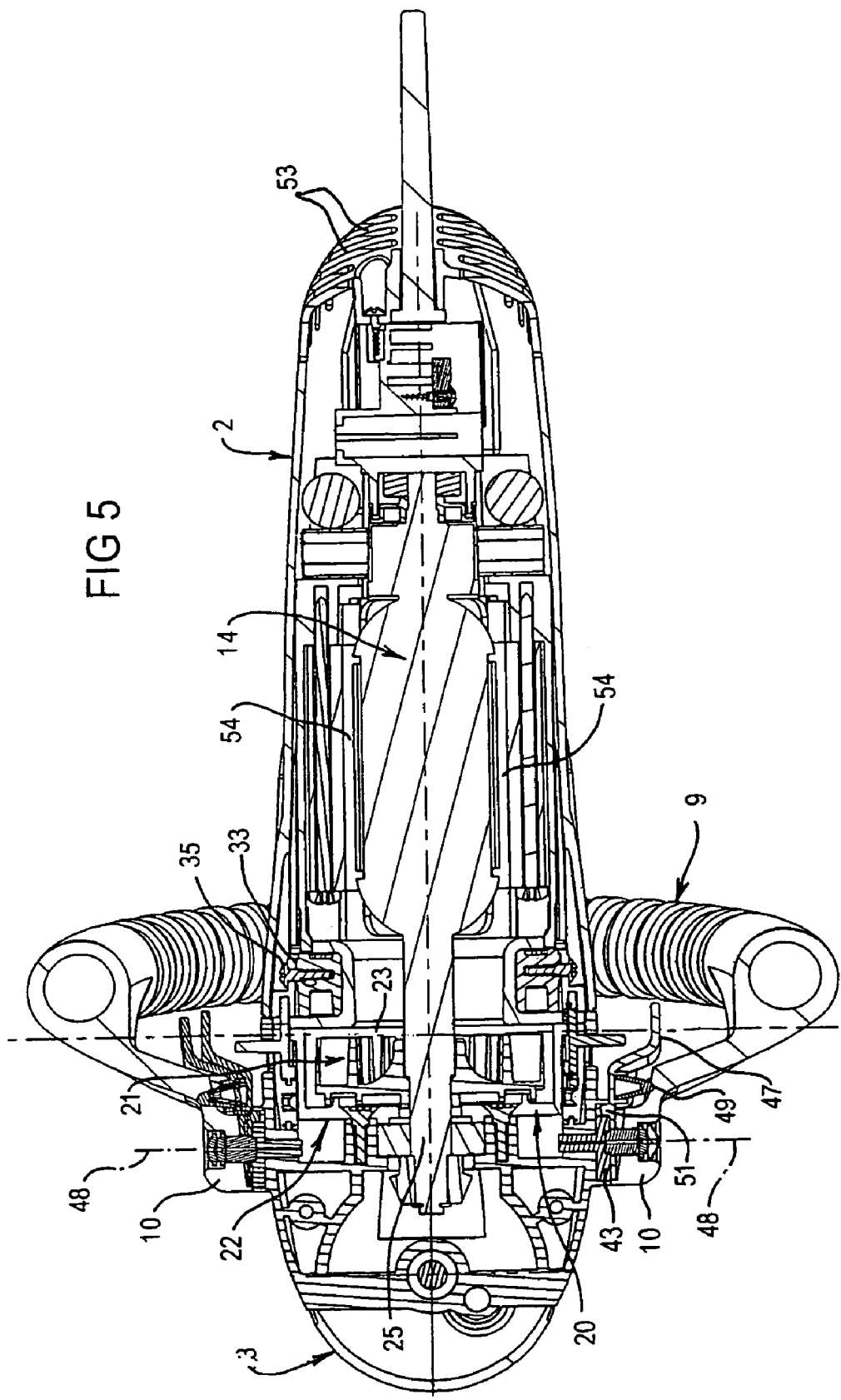
FIG. 5 is a bottom horizontal sectional view of the tool of FIG. 1.
Figure 6:
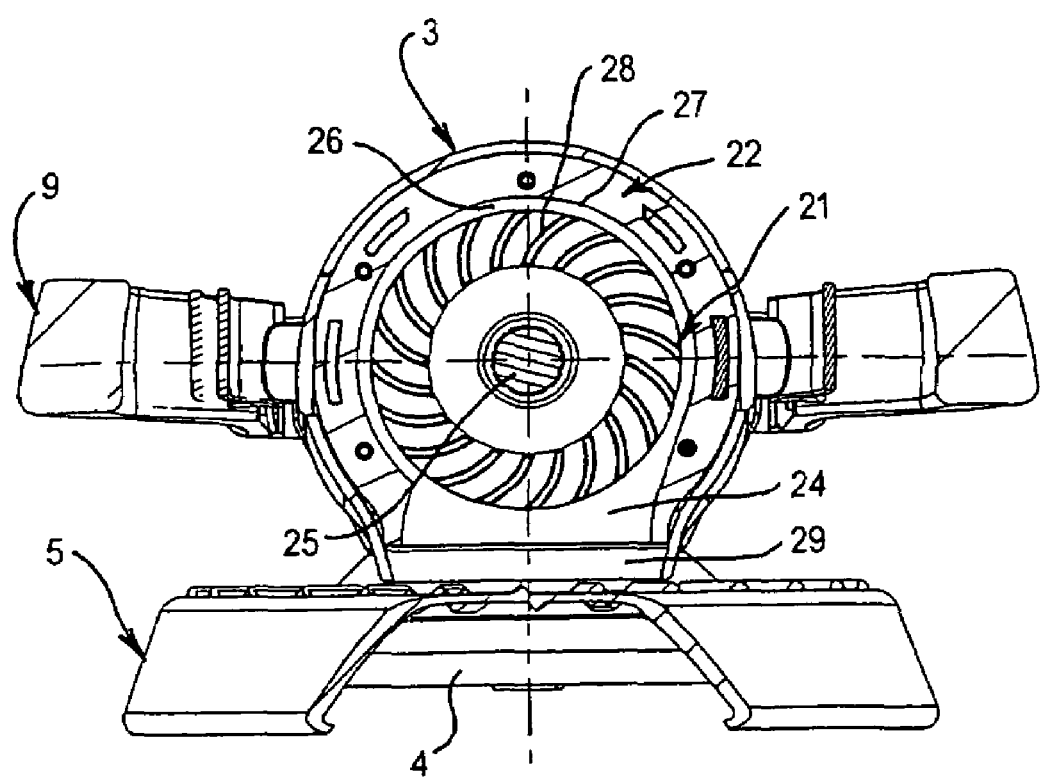
FIG. 6 is a front vertical sectional view of the tool of FIG. 1.

It is preferred, but not essential, that the propelling means includes a blower-type device 20 (FIGS. 5 and 6). In the example shown, the blower 20 includes an impeller 21 rotatably mounted within a hollow housing 22 having an air inlet 23 (FIG. 5) and an air outlet 24 (FIG. 6). It is preferred, as shown, that both the impeller 21 and the inlet 23 are arranged substantially co-axial with the drive motor 14. It is further preferred that the impeller 21 is connected to a spindle 25 of the motor 14 so as to be driven by the motor 14.

A chamber 26 is formed between the periphery of the impeller 21 and an inner surface 27 of the housing 22. The impeller 21 includes a plurality of vanes 28, and the number and configuration of those vanes is selected to assist achievement of the result hereafter described. Similarly, proper selection of the space between the periphery of the impeller 21 and the housing surface 27 may influence achievement of the desired result. In the example arrangement shown by FIG. 6, it is intended that the impeller 21 be driven to rotate in a clockwise direction.

In the arrangement shown, the housing outlet 24 communicates with exhaust means including a duct 29 extending downwardly towards the shroud 5. The shroud plate section 6 includes a plurality of openings 30 to allow air to pass from the duct 29 to the upper surface and periphery of the disc 4. Such openings 30 may be provided around substantially the full extent of the plate section 6. It is preferred that an angled louvre 31 extends over each opening 30. Each louvre 31 is arranged to urge the air to flow through the respective opening 30 in a direction that is generally the same as the direction of rotation of the disc 4. Such an arrangement promotes attachment between the disc 4 and the air flowing into the shroud 5 through the openings 30, and thereby maximizes the cooling influence of that air flow. By way of example only, the louvres 31 may be disposed at approximately 45 degrees relative to the body of the plate section 6.

The head portion 3 of the tool 1 may be movable relative to the body portion 2 so as to allow selection of any one of a number of dispositions for the disc 4. In the arrangement shown, the head portion 3 is mounted on the body portion 2 for relative rotation about an axis substantially coincident with the axis of the motor spindle 25. Other arrangements could be adopted.

Figure 7:
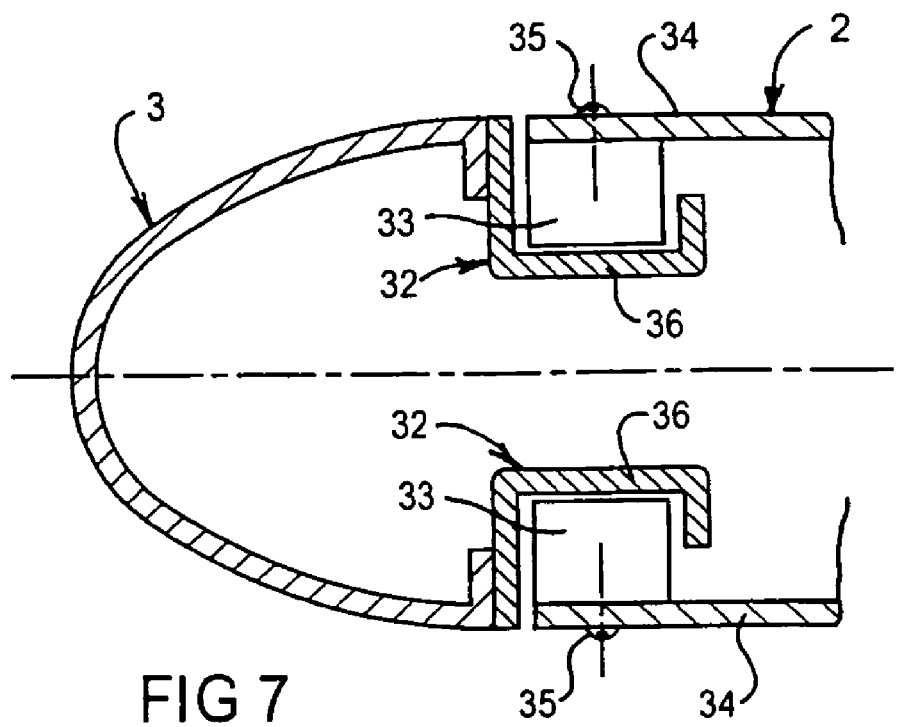
FIG. 7 is a top horizontal partial sectional view of a front portion of the tool of FIG. 1.

As best seen in FIG. 7, which is a diagrammatic illustration, the rotatable connection between the head portion 3 and the body portion 2 may include a bearing collar 32 secured to the body of the head portion 3, and two half-ring bearings 33 secured to a wall 34 of the body portion 2. It may be convenient to secure each half-ring bearing 33 to the body portion by means of fastening screws 35, as shown by FIG. 5. The collar 32 may have a channel section 36 (FIG. 7) to provide a location for the half-ring bearings 33.

Any suitable means may be adopted to selectively lock the head portion 3 in any one of the available positions of rotation. Also, the number of such positions can be selected to suit requirements. In the example embodiment shown, the head portion 3 is capable of 360 degree rotation relative to the body portion 2, and can be locked in any one of twelve equally spaced positions of rotation.

Figure 8:
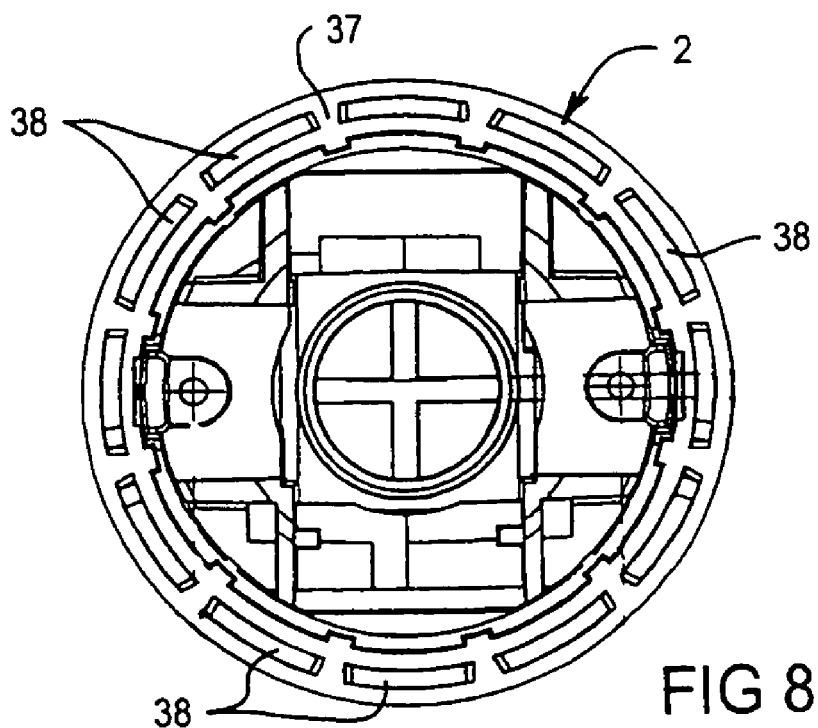
FIG. 8 is a front vertical partial sectional view of a rear portion of the tool of FIG. 1.

The head locking means for the head portion 3 may include a spring influenced detent that is engagable in any one of a number of co-operative openings, or recesses, provided in an indexing member. In the example arrangement shown, an end surface 37 (FIGS. 8 and 9) of the body portion 2 forms the indexing member, but other arrangements could be adopted. A series of equally spaced recess 38 is formed in the surface 37, and it is preferred that twelve recesses 38 constitute that series.

Figure 9:
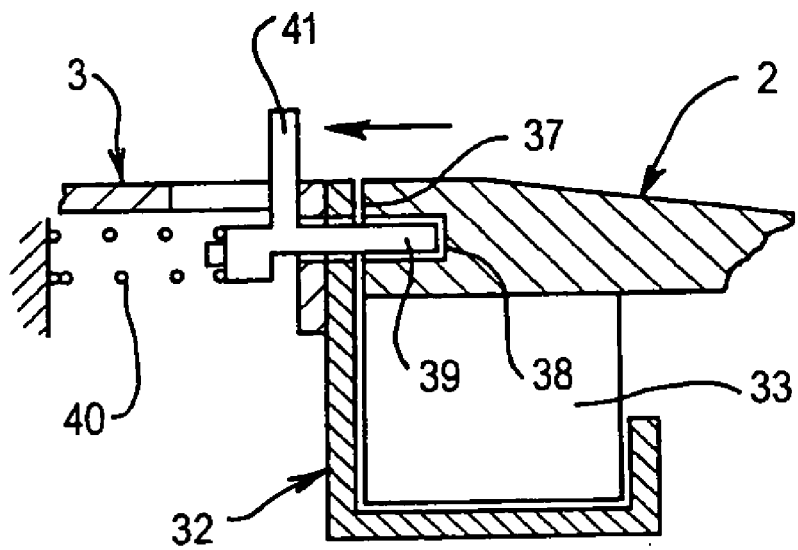
FIG. 9 is a side vertical partial sectional view of a detent for connecting a head portion 3 and body portion 2 of the tool of FIG. 1.

A spring influenced detent 39 mounted on the head portion 3 is adapted to engage in a selected one of the recesses 38 and thereby hold the head portion 3 against rotation relative to the body portion 2. FIG. 9 illustrates, in a diagrammatic manner, one particular arrangement of the detent 39. In that arrangement, the detent 39 is slidably mounted on the head portion 3 so as to be movable into and out of any one of the recesses 38. A compression spring 40 urges the detent 39 towards the surface 37, and into a recess 38 when the detent 39 is correctly aligned with that recess. Release movement of the detent 39 is achieved by applying finger pressure against an arm 41 connected to and extending laterally from the detent 39. When that finger pressure is removed, the spring 40 urges the detent 39 back towards the surface 37 so that it can again lock in any one of the recesses 38.

It is preferred that a detent 39 is provided at each of two opposite sides of the tool 1, and such an arrangement is shown by FIG. 5. The arrangement of the detent 39 at each side may be as described above in relation to FIG. 9.

Means may be provided to enable the handle 9 to be moved relative to the head portion 3 so as to adopt any one of two or more relative positions. The position of the handle 9 shown by FIGS. 1 to 4, can be regarded as the normal position of the handle 9.

Figure 10:
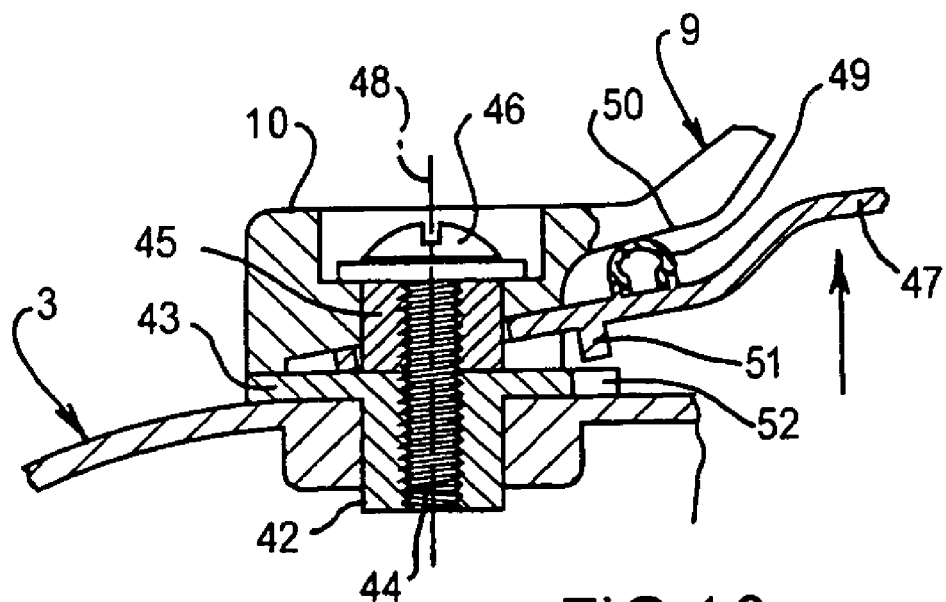
FIG. 10 is a front vertical partial sectional view of one end 10 of handle 9 secured to the head portion 3 of the tool of FIG. 1.

In the example arrangement shown, each end 10 of the handle 9 is pivotally connected to a respective one of the two sides of the head portion 3. That pivotal connection can be achieved in any suitable manner. A preferred form of pivotal connection is shown, in diagrammatic form, by FIG. 10. An internally threaded sleeve 42 having a flange 43 at one end, is secured to each side of the head portion 3 in a manner such as to be held against rotation. As shown by FIG. 10, the flange 43 bears against an outside surface of the head portion 3. Each end 10 of the handle 9 is secured to a respective one of the sleeves 42 by means of a fastening screw 44. It is preferred that a spacer sleeve 45, is located between the head 46 of the screw 44 and the flange 43 so as to ensure that the handle end 10 is left sufficiently free to be rotatable about the axis of the screw 44.

Handle locking means may be provided to enable the handle 9 to be releasably locked in any one of two or more positions of rotation relative to the head portion 3. In the FIG. 10 arrangement, the handle locking mean includes a lever 47 mounted between the handle end 10 and the pivot mounting flange 43 in a manner such as to be movable between lock and release positions. Lever 47 is mounted on the handle end 10 in such a way that it cannot rotate relative to that end 10 about the axis 48 of the pivotal connection.

FIG. 10 shows the lever 47 in the release position, and FIG. 5 shows the lever 47 in the lock position. As shown by FIG. 5, it is preferred that handle locking means is provided at each end 10 of the handle 9.

Lever 47 is biased towards the lock position by suitable biasing means, which in the example shown includes a hollow resilient member 49 interposed between the lever 47 and an opposed surface 50 of the handle 9. The biasing member 49 collapses in the axial direction when the lever 47 is manually lifted into the release position as shown by FIG. 10. When manual pressure is released, internal stress within the member 49 causes that member to expand axially and thereby push the lever 47 back to the lock position as shown by FIG. 5. In the lock position, a laterally projecting lug 51 of the lever 47 locates in a recess or hole 52 provided in the flange 43 as shown by FIG. 5. Since the lever 47 cannot rotate relative to the handle end 10, and the sleeve 42 cannot rotate relative to the head portion 3, location of the lug 51 in the recess or hole 52 prevents rotation of the handle 9 about the pivot axis 48.

In circumstances where the handle 9 is to be capable of being locked in more than one position, the flange 43 will be provided with a number of recesses or holes 52, and that number will be equal to the number of handle positions. The spacing between those recesses or holes 52 can be determined according to the desired positions of the handle 9. By way of example, in one such position, the handle 9 may be located forwardly of the normal position as shown by FIGS. 1 to 4, so as to provide a surface engaging rest if the tool is to be supported on a surface in an upside down position. When the handle 9 is in that forward location, the handle 9 and the top surface of the body portion 2 can engage an underlying surface to support the tool 1 in a substantially horizontal inverted disposition.

It is preferred that the head portion detents 39 cannot be released, at least in a convenient manner, while the handle 9 is in the normal position as shown by FIGS. 1 to 4. Release of the detents 39 is made possible, or convenient to achieve, by moving the handle 9 out of the normal position, and preferably forward of that position.

The pivot mountings for the handle ends 10 are preferably constructed so as to be capable of accepting the fastening screw of a standard stub handle. That permits one or two stub handles to be substituted for the loop handle 9. If desired, one or more additional handle mounting points may be provided around the head portion 3 so as to extend the choice of the positions for stub handles, and possibly also provide two or more alternative positions for the loop handle.

When the tool 1 as described above is operated, rotation of the impeller 21 causes air to be induced to flow into the body portion 2 through openings 53 provided at or near the rear end of the tool 1. The inducted air flows from the openings 53 to the housing inlet 23 by way of a passage or passages 54. Air flow through the passage or passages 54 has a cooling influence on the motor 14. Air received within the housing 22 is driven to the outlet 24, possibly in a compressed state, and from there into the shroud 5 by way of the duct 29 and the shroud openings 30. The air flow into the shroud 5 provides a cooling influence at the working zone of the tool.

Rotation of the disc 4 in the shroud 5 also tends to induce air to flow into the shroud 5 by way of the openings 30.

Swarf and debris tends to be removed from the disc 4 by centrifugal action, but air flow through the shroud 5 can assist that removal and also assist in removing swarf and debris from the working zone in general.

It is an aim of the tool design to maximise air flow to the working zone, and thereby maximise the cooling influence of the air flow. Factors contributing to that result include the design of the impeller 21 and the design of the housing 22.

It will be apparent from the foregoing description that a power tool incorporating the invention has several benefits. Cooling at the working zone is particularly beneficial in that it promotes a longer working life for the operative element of the tool. The automatic shut-down facility has a valuable safety benefit, and adjustment of the head position and the handle position enables the tool to be used with maximum comfort and efficiency in a wide variety of working situations.

It is to be understood that various alterations, modifications and/or additions may be introduced into the constructions and arrangements of the parts previously described without departing from the spirit or ambit of the invention as defined by the appended claims.

What is claimed is:

1. A power tool including:
   a head portion having a shroud attached thereto for surrounding part of an operative element, the operative element being provided for treating a face of a work piece,
   a body portion including an electric motor for driving said operative element,
   propelling means having a rotary impeller mounted within a hollow housing, the housing having an air inlet and an air outlet, operative to induce air to flow along at least one induction passage;
   a chamber formed at least in part between the impeller and at least one internal surface of the housing,
   wherein said motor, the air inlet and the impeller are arranged substantially coaxial and relatively positioned so that the inducted air is drawn over the motor to cool the motor before entering the air inlet and the chamber, the inducted air is pressurised in the chamber and transferred by exhaust means through the shroud to a working zone of the tool;
   the working zone including the operative element and the face of the work piece, wherein the shroud is formed with an opening to expose a part of the operative element, the shroud being adjustable relative to the head portion to adjust a position of the opening relative to the head position.

2. A power tool according to claim 1 wherein the operative element is a disk, and the shroud has a plate portion that overlies the disk with a skirt portion that extends around part of a periphery of the disk, the plate and skirt being formed to define the opening to expose part of the operative element.

3. A power tool according to claim 2 wherein the plate portion has a plurality of openings to allow the pressurised air to pass through the shroud.

4. A power tool according to claim 3 wherein the disk is driven to rotate in a direction, and the plate adjacent each opening is formed to direct the air in the direction of rotation.

5. A power tool according to claim 4 wherein the plate is formed with a plurality of louvres each louvre being located adjacent each opening and extending across each opening to direct the air.

6. A power tool according to claim 1, including an automatic shut-down facility that is operative to terminate operation of said operative element in predetermined circumstances, including a circumstance in which said tool is not held properly, or a circumstance in which said tool is dropped.

7. A power tool according to claim 6, wherein said shut-down facility includes a member that is movable between a position at which said facility is activated, and a position at which said facility is deactivated, and said tool cannot be operated while said member is in said facility activated position.

8. A power tool according to claim 6, wherein said shut down facility includes a switch selectively movable between a normal position and a lock position, wherein when the member is in position to deactivate the shut down facility the switch can be moved to the lock position to lock the member in the deactivated position.

9. A power tool according to claim 8, wherein the switch is biased towards the normal position such that the switch is moved from the locked position to the normal position automatically after depressing the member.

10. A power tool according to claim 8 wherein the switch when in the lock position is manually movable to the normal position.

11. A power tool according to claim 7 including a start button that is manually operable to cause operation of said tool, provided said shut-down facility is deactivated.

12. A power tool according to claim 1, including a body portion containing said chamber and said propelling means, and a head portion carrying said operative element and being connected to said body portion.

13. A power tool according to claim 12, wherein said connection enables the position of said head portion to be adjusted relative to said body portion.

14. A power tool according to claim 13, wherein said adjustment involves rotational movement of the head portion relative to the body portion, and head locking means is operable to releasably hold said head portion in any one of two or more positions or rotation relative to said body portion.

15. A power tool according to claim 14, wherein said head locking means includes at least one detent mounted on the head portion, and two or more cooperative recesses provided ins aid body portion, said detent being engagable within a selected one of said recesses so as to thereby releasably hold said head portion in a selected one of said positions of rotation.

16. A power tool according to claim 15, wherein said head locking means includes two said detents, each detent being located on a respective one of two opposite sides of the head portion, and means biasing each said detent biased towards an engaging position at which it engages a selected said recess.

17. A power tool according to claim 1 including a handle attached to the head portion, the handle being movable relative to the head portion so as to adopt any one of two or more positions, relative to the head portion.

18. A power tool according to claim 17 including handle locking means operable to releasably lock said handle in a selected said position.

19. A power tool according to claim 18, wherein the handle locking means includes at least one lever associated with the handle, the lever having a lug which is locatable in a hole in the head portion, the lever being movable between a locked position wherein the lug is located in the hole in the head portion, and an unlocked position wherein the lug is separated from the hole in the head portion.

20. A power tool according to claim 19 including lever biasing means for biasing the lever towards the locked position.

21. A power tool according to claim 19, wherein the head portion includes two or more holes to provide the two or more positions of adjustability for the handle relative to the head portion.

22. A power tool according to claim 1, wherein the tool is a grinder and the operating element is a grinding or cutting disc.

* * * * *